United States Patent [19]

Wang et al.

[11] Patent Number: 5,189,709
[45] Date of Patent: Feb. 23, 1993

[54] DYNAMIC PATTERN MATCHER USING INCOMPLETE DATA

[75] Inventors: Lui Wang, Houston, Tex.; Gordon G. Johnson, Princeton, N.J.

[73] Assignee: The United States of America as represented by the United States National Aeronautics and Space Administration, Washington, D.C.

[21] Appl. No.: 749,819

[22] Filed: Aug. 26, 1991

[51] Int. Cl.$^5$ ............................................. G06K 9/00
[52] U.S. Cl. ...................................... 382/10; 382/30; 381/43
[58] Field of Search ...................... 381/42, 43; 382/10, 382/14, 15, 36, 37, 38, 39, 30, 34

[56] References Cited

U.S. PATENT DOCUMENTS

| | | | |
|---|---|---|---|
| Re. 26,104 | 11/1966 | Glauberman et al. | 340/146.2 |
| 3,727,183 | 4/1973 | LeMay | 340/146.3 H |
| 3,979,722 | 9/1976 | Sakoe | 382/32 |
| 4,001,820 | 1/1977 | Rosenbaum et al. | 343/5 SA |
| 4,319,221 | 3/1982 | Sakoe | 340/146.3 Q |
| 4,446,531 | 5/1984 | Tanaka | 364/728 |
| 4,467,437 | 8/1984 | Tsuruta et al. | 382/30 |
| 4,571,697 | 2/1986 | Watanabe | 364/561 |
| 4,601,054 | 7/1986 | Watari et al. | 382/1 |
| 4,618,988 | 10/1986 | Schiller | 382/5 |
| 4,670,850 | 6/1987 | Sakoe | 381/43 |
| 4,794,528 | 12/1988 | Hirose et al. | 364/300 |
| 4,817,176 | 3/1989 | Marshall et al. | 382/43 |
| 4,882,756 | 11/1989 | Watari | 381/42 |
| 4,887,304 | 12/1989 | Terzian | 382/30 |
| 5,067,166 | 11/1991 | Ito | 382/30 |
| 5,109,431 | 4/1992 | Nishiya et al. | 382/30 |
| 5,121,465 | 6/1992 | Sakoe | 381/43 |

Primary Examiner—Jose L. Couso
Attorney, Agent, or Firm—Hardie R. Barr; Guy M. Miller; Edward K. Fein

[57] ABSTRACT

A method of matching a first query pattern with a plurality of stored data is disclosed. For each stored data pattern, the number of components are counted which are identical to corresponding components in the first query pattern, thereby forming a set of match numbers equals the number of components in any stored pattern, that stored data pattern is displayed as an output pattern set indicating a match. If no match exists then a second query pattern is determined by modifying the first query pattern, component by component, in dependence upon both a first, global influence of all stored patterns on all components of the first query pattern and a second, particular influence of all stored patterns on each respective component of the first query pattern. The first two method steps are then repeated using the second query pattern in place of the first query pattern. If no match a third query pattern similarly is determined by modifying the second query pattern. Finally, the output pattern is displayed, component by component, with those respective components of the third query pattern that have been modified at most once from the first query pattern.

20 Claims, 3 Drawing Sheets

DYNAMIC PATTERN MATCHER USING INCOMPLETE DATA

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

Field of the Invention

This invention relates generally to pattern matching systems, and more particularly to a method for dynamically adapting the system to enhance the effectiveness of a pattern match.

State of the Art

Apparatus and methods for calculating the similarity between patterns are known. For example, U.S. Pat. No. 3,727,183 to LeMay discloses a pattern recognition device using an image recognition algorithm capable of compensating for registration errors. A scanning waveform is used to scan the input image. The scanning waveform is capable of being modified to minimize the degree of error.

U.S. Pat. No. 4,446,531 to Tanaka teaches the use of a computer for calculating the similarity between patterns employing a pattern recognition technique using height or "weight" factors as measures of relative importance.

U.S. Pat. No. Re. 26,104 to Glauberman et al discloses data processing apparatus utilizing a pattern recognition method designed for analyzing character symbols.

U.S. Pat. No. 4,319,221 to Sakoe shows a pattern recognition arrangement wherein a single input pattern feature vector is pattern matched with the reference pattern.

There is considerable interest in the storage and retrieval of data, particularly, when the search is called or initiated by incomplete information. For many search algorithms, a query initiating a data search requires exact information, and the data file is searched for an exact match. Inability to find an exact match thus results in a failure of the system or method.

It is therefore desirable to provide a method of storage and retrieval that shares some of the attributes of an artificial neural network (ANN), such as searching for a match using a query having only incomplete information, while avoiding some of the deficiencies such as long "learning" time and possible "retraining" when additional data is stored. In addition, it is desirable to provide several features not available in ANN systems, such as attaching relative importance as well as time dependence to stored data points. Thus, stored data may change in importance over time, whether the time dependent change is caused by the user, by outside input, or simply by a programmed degradation or appreciation over time. It is desirable that the stored data be allowed to change in this way without affecting the speed of retrieval or requiring additional training.

SUMMARY OF THE INVENTION

It is an object of the present invention to find an exact match between a query pattern and one or more stored patterns, if an exact match exists.

It is another object of the present invention to find the "best" match between a query pattern and a stored pattern; i.e., to find one or more stored patterns which are the closest to a match with the query pattern if no exact match exists.

It is an additional object of the present invention to isolate a subset of the stored patterns for which a partial match is possible and to distinguish those portions of the stored patterns in the subset which match the query from those portions which do not match and are therefore ambiguous.

It is a further object of the present invention to allow the user to efficiently enhance the probability of a match by focusing on only the ambiguous portion of the stored and query patterns.

It is a still further object of the present invention to allow the user to efficiently enhance the probability of a match by restating the query with additional data.

It is a yet further object of the present invention to allow the user to efficiently enhance the probability of a match by storing more data.

It is an even further object of the present invention to allow the user to efficiently enhance the probability of a match by modifying one or more of the stored patterns.

The present invention incorporates procedures that seek a response which will be exact, if the query is an exact match to a positive stored data item of a given relative importance, or a "reasonable guess" in view of both the query and the stored data. The invention will return a stored item if the query is within a predetermined variance of a stored item, or the response may contain certain "ambiguous" components indicating that there is a conflict in the stored data that causes an inexact response to the particular query. The particular portions of the pattern which are ambiguous are indicated to the user. The invention, in this event, asks for instructions as to how the user wishes to proceed in effecting a match, as for example, changing the data in the query or changing one or more of the stored patterns.

Many physical entities (photographs, electrocardiograms, voice patterns, seismic signatures, written documents, star patterns, fingerprints, eye fundus patterns, etc.) are capable of being represented by patterns of other physical entities (elements) in some format suitable for electronic systems such as a sequence of digital electronic signals. As is well known, these patterns are capable of being stored in a computer memory to create a library of stored patterns. The present invention makes use of this capability as well as the ability to incorporate within each pattern a relative time-dependent importance property.

Preferably, the query pattern comprising a set of elements representative of the entity to be matched is also created in the same format as the stored patterns. If not, it should be converted to this format prior to pattern matching.

The aforementioned objects and advantages are achieved in accordance with the present invention, by the following method:

The data to be stored and queried, as well as the query itself, is assumed to be in the form of binary lattice points $(1,1,0,0, \ldots, 0)$; that is, as points (also called "patterns") in a finite dimensional space having only zero or one as components. A positive integer n is used to indicate the length of such a point; i.e., the number of components or elements defining the point. The data and query are then stored in the n-dimensional space. For example, if the data points to be stored, as well as the queries, are of the form (0,0,1,0) or (1,0,1,0), then n=four.

Let K denote the number of data points or patterns stored. For each data point $B^m$, where m is an integer from 1 to K, we have $$B^m = (b^m_1, \ldots, b^m_n)$$

which is point associated with the time $t_m$. For each point $B^m$ we define an integer $H(m, t_m)$ indicating the relative importance of the point with respect to the other points at the time $t_m$. The function $H(m,t_m)$ (which is the coefficient of a positive integer P, to be more fully explained later), may be allowed to increment or decrement as the time parameter t varies from some initial time. In addition, for the point $B^m$ there is associated with the relative importance $H(m,t_m)$ a direction number $C(m,t_m)$ indicating whether the point should be sought; i.e., whether it is attractive, (a positive one); avoided or repelled (a negative one); or ignored (a zero).

Generally, the method of the present invention involves a comparison of a query pattern with each of the stored patterns, on an element-by-element basis to determine the total number of elements which match, called the "degree of match", for each stored pattern. A "complete match" is said to exist between the query and one or more of the stored patterns if the degree of match for any stored pattern or patterns is equal to (or within some predetermined variation from) the number of elements in the patterns. For some applications, locating a complete match finishes the exercise. In other applications (for example, when H(m,t) is a much more significant factor that the degree of match) the pattern matching procedure continues. Of course, if C(m,t) is zero a complete match is not-significant.

If no complete match is found by this first element-by-element comparison, a new or shifted query, called the "derived query," is formulated from the original query. In formulating the derived query, use is made of the closeness of match, or degree of match, between the query of each of the stored patterns determined in the first comparison. In this way, the probability of a match between one or more of the stored patterns and the derived query is increased.

The derived query is then compared on an element-by-element basis with each of the stored patterns in another attempt to find a match. The closeness of match of the derived query with each of the stored patterns is also determined and may be called the "second degree of match".

A complete match between the derived query and one or more of the stored patterns exists and is indicated if the second degree of match for any stored pattern is equal to the number of elements in the patterns. If a complete match is not found with the derived query pattern, a response pattern is created from the original query pattern and other information determined from the comparisons of the original and derived query patterns with the stored patterns. The response or "answer" pattern has as its elements both "determined" elements—i.e., those which are identical with corresponding elements of one (or more) or the set of closest stored patterns—as well as "ambiguous" elements (those which are not identical).

The representational format of the answer pattern may then be converted to a desired (usually the original) format (photograph, etc.) with the ambiguous elements distinguished from the determined elements in some manner (e.g., lighter, darker, as + or −, etc.)

Various manipulations may then be performed to enhance the probability of match, such as refining, enhancing, supplementing, etc., the ambiguous portions of the query and repeating the above steps.

The preferred embodiments of the present invention will now be described with reference to the accompanying drawings.

DESCRIPTION OF THE PREFERRED EMBODIMENTS

Conceptual Illustration

Figure 1:
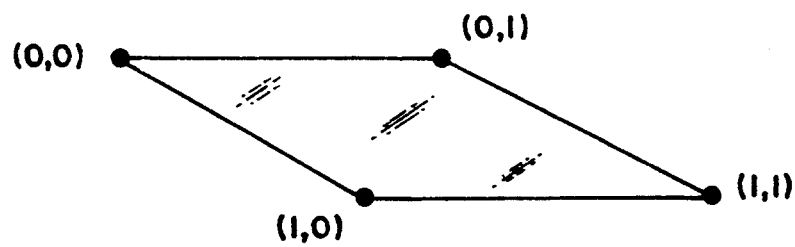
FIG. 1 is a representational diagram of a two-dimensional figure (n=2) having vertices at all binary points.
Figure 2:
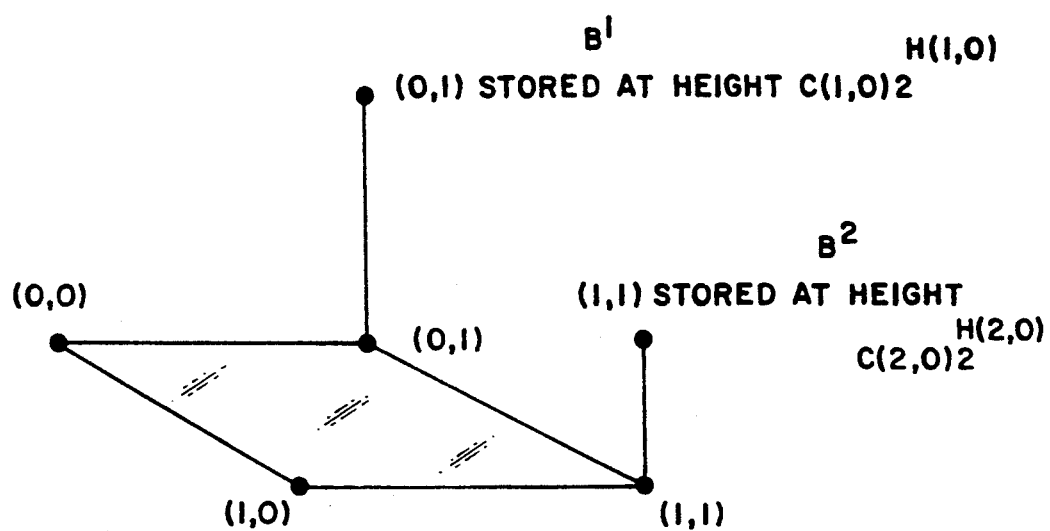
FIG. 2 is a representational diagram of the two-dimensional figure of FIG. 1 in which two stored points of prescribed height are placed perpendicular to the two-dimensional figure.

As an illustration of the present invention, consider an n-dimensional cube with a direction and relative importance of $C(m,t)P^{H(m,t)}$ (see FIG. 1 for n=2). The relative importance of each stored point $B^m$ may be shown by placing a point in the n+1 dimension space perpendicular to the n-dimensional cube with direction and relative importance of $C(m,t)P^{H(m,t)}$. FIG. 2 illustrates the case where n=2; two points, $B^1$ and $B^2$, are stored at (0,1) and (1,1) with relative importance magnitudes of H(1,t) and H(2,t), respectively. The direction numbers C(1,t) and C(2,t) are both positive ones since relative importance H(1,t) and H(2,t) both are shown in the positive n+1 direction.

Figure 3:
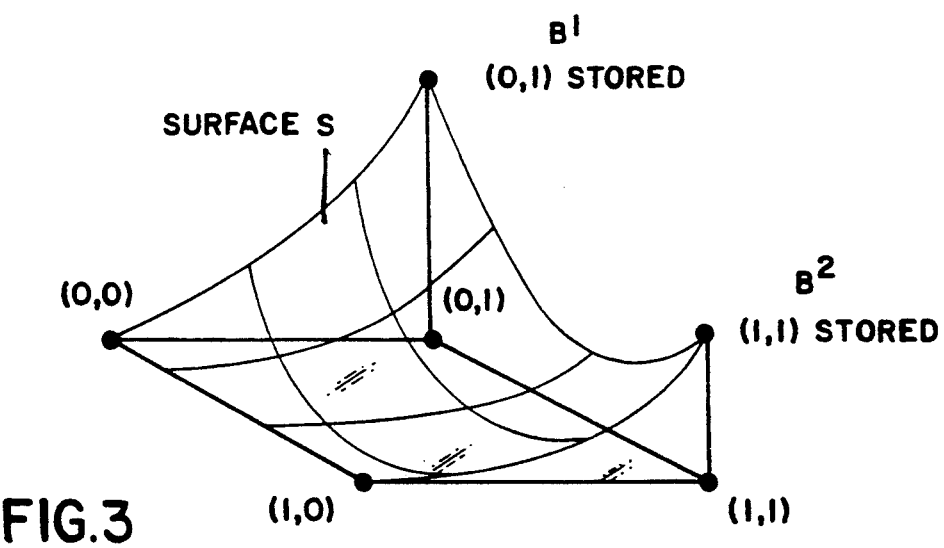
FIG. 3 is a representational diagram identical to that of FIG. 2 in which a smooth surface S is formed over the set of points in three-dimensional space.

As an assist in conceptualizing, imagine a smooth surface S formed over the set of points in n+1 dimensional space. As shown in FIG. 3, this undulating surface rises at stored points with a positive C value, falls toward a zero height over non-stored points, and is negative at points that are to be avoided; i.e., points having a negative C value. This surface may change in time as the relative importance (magnitude of H) of stored data items (patterns) increment or decrement. It also, of course, changes as the sign of C changes.

For purposes of this invention, significance lies not so much in the surface itself, but, rather, in the slope of the surface in each of the n directions at a point of interest such as a query point. (See FIG. 4.)

If a query point (pattern) is present, noting also that it is a binary point in the n-dimensioned cube, it is desired to determine toward which binary point in the cube it would need to move to effect a match. Assuming that "high" or relatively important points attract, relatively lower points attract less and negative points repulse, the tendency at the query point would be to move accordingly. Ambiguities may exist, as when the query is equally attracted to two or more binary points (or equally repulsed by two or more points).

Figure 5:
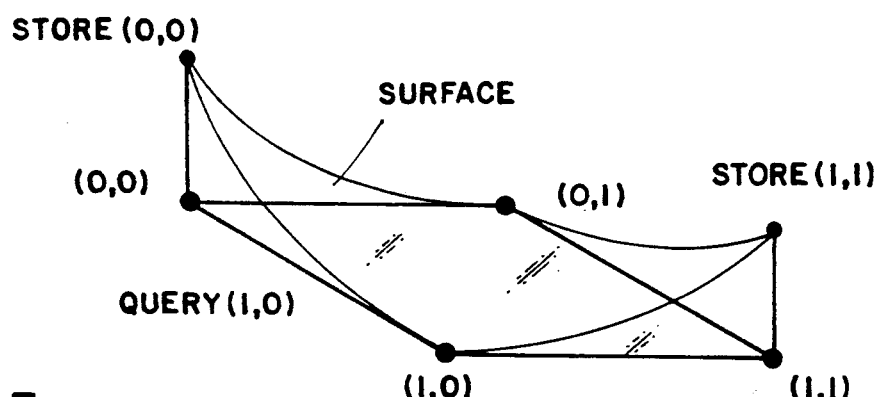
FIG. 5 is a representational diagram showing two stored points placed on a two dimensional figure and illustrating a conflict in the stored data.

For example, in FIG. 5, assume that stored points (0,0) and (1,1) have the same relative importance, signified by the same height perpendicular to the n-dimensioned cube. A query at point (1,0) would be equally attracted to both points, as would a query at point (0,1), thus a conflict or ambiguity is indicated. On the other hand, a query at point (1,1) would encounter no conflict and would be most strongly attracted to point (1,1)—i.e, no movement—because the slope of the surface S is zero in every direction. Likewise, a query at point (0,0) would have no tendency to move from that point. Of course, if the relative importance of (1,1) and (0,0) were significantly different, then the response to a query such as (1,0) would not be ambiguous, it would move toward the relatively more important point. The invention facilitates dealing with ambiguities as will be explained in detail hereinbelow.

As previously noted, the imaginary surface S is not significant; only its slope at points of interest (query points) is important in the decision process. Further, the magnitude of the slope is not necessarily significant for our purposes, only its algebraic sign. If the sign of the slope in the $i^{th}$ direction is positive, then the point should "move" in the $i^{th}$ direction, while if the sign is negative, the query point should "move" in the negative $i^{th}$ direction. When the slope in the $i^{th}$ direction is zero, there is no "movement" in the $i^{th}$ direction.

Figure 6:
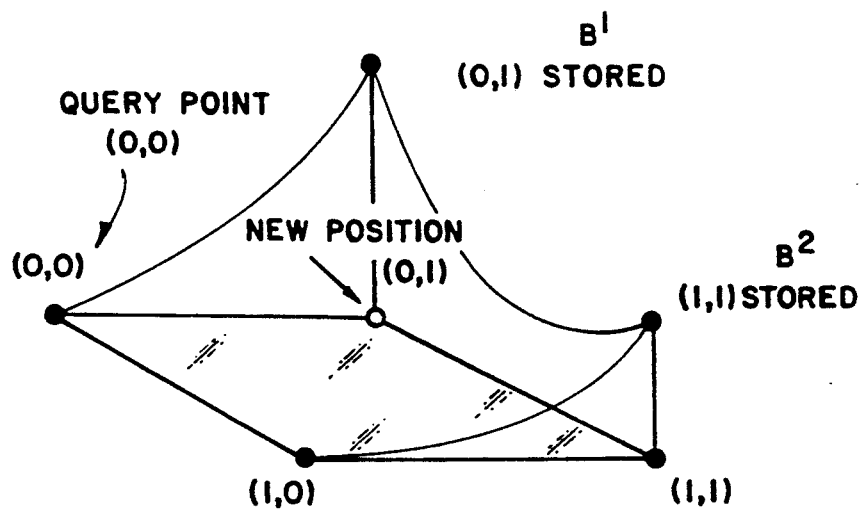
FIG. 6 is a representational diagram similar to that of FIGS. 1-4 illustrating that the query point is "moved" to a new position.

The method according to the present invention proceeds as follows: The slopes in each of n directions on the surface are determined for the query point and the values stored. A new or "shifted" query point (not necessarily a binary point) is determined from the original query in a manner to be described below, and it is then applied to the n-dimensioned cube. The slopes in each of the n directions on the surface at the new position (the second slopes) are determined and the values noted and stored, completing the numerical computations. (See FIG. 6.) It should be noted that no more than two iterations are required to determine the response. The information gained from the computations can be analyzed for a response to the original query.

The sign of the slope in each direction at the original query point is noted; thereafter, the sign of the slope in each direction at the shifted query point is noted.

The response point or answer pattern is formed from the original query point and the slopes of the original and shifted query points as follows:

If the $i^{th}$ component or element of the query point is 0 and both the first slope and the second slope in the $i^{th}$ direction are positive, then the $i^{th}$ element of the response is 1.

If the $i^{th}$ element of the query point is 1 and both slopes in the $i^{th}$ direction are negative, the $i^{th}$ element of the response is 0.

If the $i^{th}$ element of the query point is 0 and the first slope in the $i^{th}$ direction is negative, then the $i^{th}$ element of the response is 0.

If the $i^{th}$ element of the query point is 1 and the first slope in the $i^{th}$ direction is positive, then the $i^{th}$ element of the response is 1.

If the $i^{th}$ element of the query point is 0, the first slope in the $i^{th}$ direction is positive and the second slope in the $i^{th}$ is negative, then the $i^{th}$ element of the response is ambiguous (denoted herein by the symbol *).

If the $i^{th}$ element of the query point is 1, the first slope in the $i^{th}$ direction is negative and the second slope in the $i^{th}$ direction is positive, then the $i^{th}$ element of the response is ambiguous; i.e., *.

Thus the response is of the form (0,0,1,1,1, . . . ,1,0,1) for a definitive response or complete match, or the response is of the form (0,0,1,*,1 . . . ,*,0,1) when some of the elements are ambiguous; i.e., the response is partially ambiguous. A complete match is said to exist if the degree of match is equal to the number of elements in the patterns. In the case of a partially ambiguous response, there are several options or combination of options available to the user. One, obviously, is to rephrase the query or use another query. Another is to store more data in the stored patterns, and yet another is to modify some of the stored data.

It should be noted that the stored points, each of which has a time dependent relative importance property, can decrement over time to a near zero value, or become negative or positive or zero, thus allowing a stored point to more strongly attract (or repulse) or ignore. While the relative importance property of a point can be increased or decreased at any time, or allowed to remain constant, none of these changes require any "retraining time". This particular feature is not found in artificial neural systems.

FIRST EXAMPLE

The following example of this method was installed and operated in a Symbolic computer using a LISP program as set forth in the attached Appendix. It should be pointed out that both the "zero" and "one" elements of a point were considered to be of equal significance. Using the previously stated concepts, a pattern match was attempted between a query pattern and a library of stored patterns to determine a response or answer pattern using the following algorithm:

(1) Suppose that n is the maximum length of a point to be stored.

(2) Each of $B^1, B^2, \ldots, B^k$ is a data point to be stored of relative importance $H(1,t_1), \ldots, H(k,t_k)$ and sign $C(1,t_1), \ldots, C(k,t_k)$ respectively.

(3) Let P denote a positive prime number (for mod P calculations) and each of L and L' an integer $(L > L' > 1)$.

(4) Let $X = (x_1, \ldots, x_n)$ be a query point.

(5) We first compute and store, for each integer i from 1 to n, the value of the $D_{1,i}$ (see below), which is proportional to the slope in the $i^{th}$ direction at the query point $X = (x_1, \ldots, x_n)$, $$D_{1,i}[i]: X:B^1, \ldots, B^k) = C(1,t) P^{H(1,t)} [P^{L-l(X,1)}] S_1(X,i) +$$

$$C(2,t) P^{H(2,t)} [P^{L-l(X,2)}] S_2(X,i) +$$

$$C(3,t) P^{H(3,t)} [P^{L-l(X,3)}] S_3(X,i) + \ldots +$$

$$C(k,t) P^{H(k,t)} [P^{L-l(X,k)}] S_k(X,i)$$

where
(1) $C(m,t)$ is the sign (or 0) of the stored point $B^m$ at time t (if 0, C is then ignored in computations),
(2) $H(m,t)$ is the height of the stored point $B^m$ at time t,
(3) $J(X,j)$ is the number of components of B that agree with the corresponding component of X, i.e., a measure of closeness and
(4) $S_j(X,i)$ is $-1$ if the $i^{th}$ component of $B^j$ agrees with the $i^{th}$ component of X and is 0;
1 if the $i^{th}$ component of $B^j$ agrees with the $i^{th}$ component of X and is 1;
$-P^3$ if the $i^{th}$ component of X is 1 and the $i^{th}$ component of $B^j$ is 0; and
$P^3$ if the $i^{th}$ component of X is 0 and the $i^{th}$ component of $B^j$ is 1.

P can be any prime number. In the preferred embodiment, $P=2$.

(6) A new point X' is formed from the query point X and the signs of the numbers $D_{1,1}([t]:X:B^1,\ldots,B^k),\ldots,D_{1,n}([t]:X:B^1,\ldots,B^k)$ in the following manner:

If the $i^{th}$ component of the query point is 0 and $D_{1,i}([t]:X:B^1,\ldots,B^k)$ is positive, then the $i^{th}$ component of X' is 1;

If the $i^{th}$ component of the query point is 1 and $D_{1,i}([t]:X:B^1,\ldots,B^k)$ is negative, then the $i^{th}$ component of X' is 0; and If the $i^{th}$ component of the query point is 0 and $D_{1,i}([t]:X:B^1,\ldots,B^k)$ is zero, then the $i^{th}$ component of X' is the $i^{th}$ component of X.

(7) For each integer i from 1 to n, we compute and store the value of the $D_{2,i}$ (see below), which is proportional to the slope in the $i^{th}$ direction at the shifted point $X'=(x'_1,\ldots,x'_n)$.

$$D_{2,i}[t]: X:B^1,\ldots,B^k) = C(1,t)\, P^{H(1,t)}\, [P^{L'\cdot J(X',1)}]\, S_1(X',i) + \ldots + C(k,t)\, P^{H(k,t)}\, [P^{L'\cdot J(X',k)}]\, S_k(X',i)$$

where
(1) $C(m,t)$ is the sign (or 0) of the stored point $B^m$ at time t;
(2) $H(i,t)$ is the height of the stored point $B^i$ at time t;
(3) $J(X',J)$ is the number of components of $B^j$ that agree with the corresponding component of X'; and
(4) $S_j(X',i)$ is $-1$ if the $i^{th}$ component of $B^j$ agrees with the $i^{th}$ component of X' and is 0;
1 if the $i^{th}$ component of $B^j$ agrees with the $i^{th}$ component of X' and is 1;
$-P^3$ if the $i^{th}$ component of X' is 1 and the $i^{th}$ component of $B^j$ is 0; and
$P^3$ if the $i^{th}$ component of X' is 0 and the $i^{th}$ component of $B^j$ is 1.

At this point the response to the original query is made in the following manner (see FIG. 7):

(8) The value of the slope in each direction at the original query point X has been stored and the value of the slope in each direction at the shifted point X' has been stored.

If the $i^{th}$ component of the query point is 0 and both the slope of the query point X and the slope of the shifted point X' in the $i^{th}$ direction is positive, then the $i^{th}$ component of the response is 1.

If the $i^{th}$ component of the query point is 1 and both the slope of the query point X and the slope of the shifted point X' in the $i^{th}$ direction is negative, then the $i^{th}$ component of the response is 0.

If the $i^{th}$ component of the query point is 0 and the first slope in the $i^{th}$ direction is negative, then the $i^{th}$ component of the response is 0.

If the $i^{th}$ component of the query point is 1 and the first slope in the $i^{th}$ direction is positive, then the $i^{th}$ component of the response is 1.

If the $i^{th}$ component of the query point is 0, the slope of the query point X in the $i^{th}$ direction is positive and the slope of the shifted point X' in the $i^{th}$ direction is negative, then the $i^{th}$ component of the response is *; i.e., it is uncertain.

Figure 7:
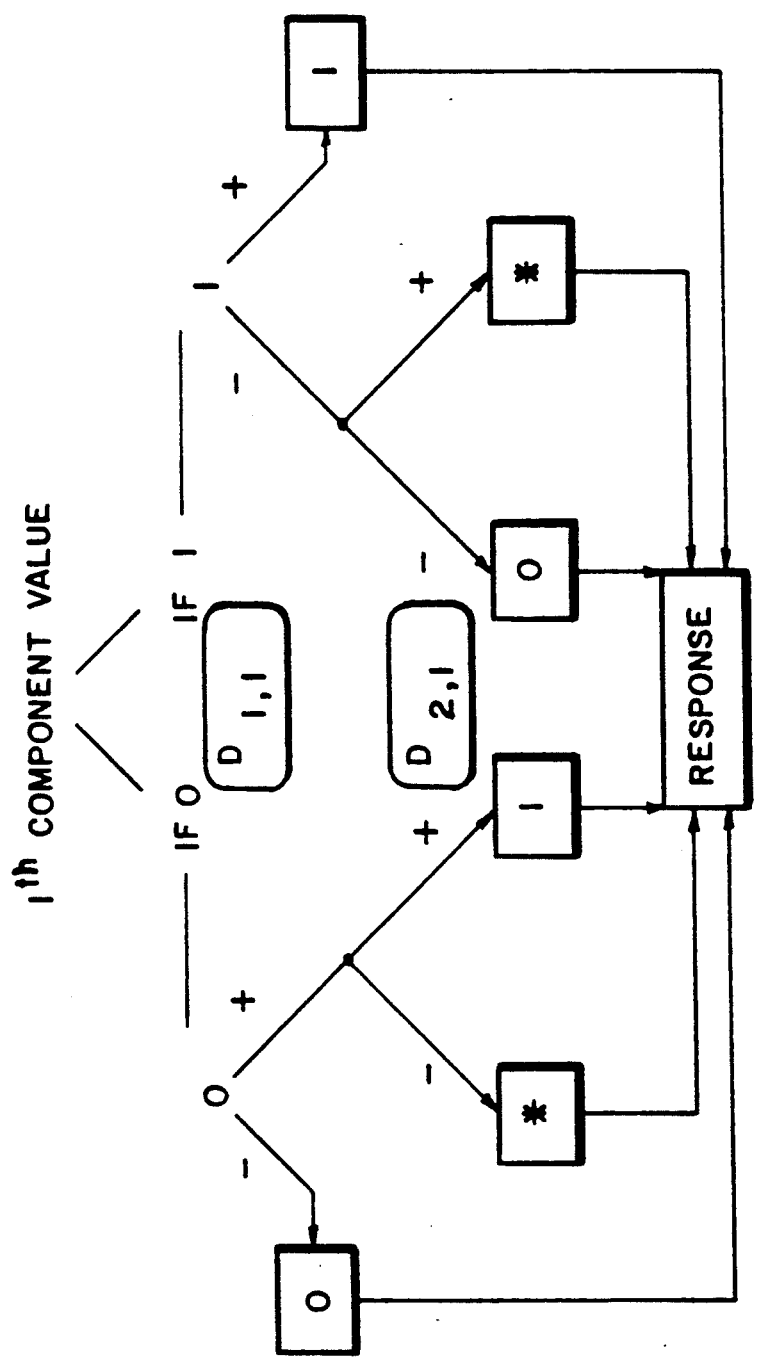
FIG. 7 is a process diagram showing the procedure for producing a response to an original query.

If the $i^{th}$ component of the query point is 1, the slope of the query point X in the $i^{th}$ direction is negative and the slope of the shifted point X' in the $i^{th}$ direction is positive, then the $i^{th}$ component of the response is *; i.e., it is uncertain. This process is shown in FIG. 7.

If there is uncertainty in the response, then the aforementioned options come into play. The machine may be queried by the user with a different query, additional data may be added and a query made, or one or more of the items stored may be modified and a query made. In any event, a query may be made immediately, as there is no "training time" required.

If there is no uncertainty, then stored data may be modified and another query made.

SECOND EXAMPLE

Figure 4:
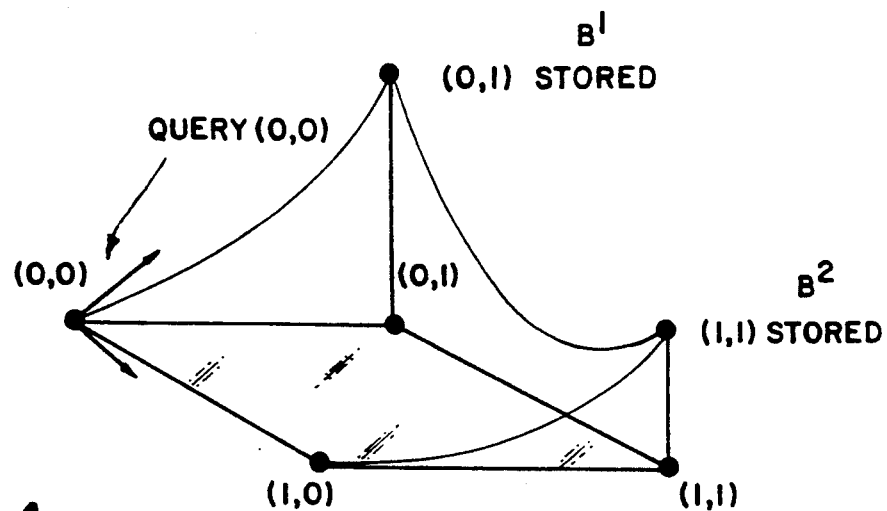
FIG. 4 is a representational diagram similar to that of FIG. 3 showing the slope of the surface at a query point thereon in each of the two directions.

In the case described in FIGS. 2, 3 and 4, the dimension is two ($n=2$) $P=2$, $L=5$ and $L'=3$ and for simplicity we set $t=t_1=t_2=0$. The points $B^1=(0,1)$ and $B^2=(1,1)$ are stored at relative importance $H(1,0)=7$ and $H(2,0)=5$ with $C(1,0)=1$ and $C(2,0)=1$. The query point is $X=(0,0)$.

For this case:

$J(X,1) = 1$,
$J(X,2) = 0$,
$S_1(X,1) = -1$,
and $S_2(X,1) = 2^3$.

We now have:
$$D_{11}(0:X:B^1,B^2) = C(1,0)\, 2^{H(1,0)}\, 2^{L\cdot J(X,1)}\, S_1(X,1) +$$
$$C(2,0)\, 2^{H(2,0)}\, 2^{L\cdot J(X,2)}\, S_2(X,1) = 1 \times 2^7 \times 2^{5\times 1}(-1) +$$
$$1 \times 2^5 \times 2^{5\times 0} \times 2^3 = -2^{12} + 2^8 < 0.$$

$$D_{12}(0:X:B^1,B^2) = C(1,0)\, 2^{H(1,0)}\, 2^{L\cdot J(X,1)}\, S_1(X,2) +$$
$$C(2,0)\, 2^{H(2,0)}\, 2^{L\cdot J(X,2)}\, S_2(X,2) = 1 \times 2^7 \times 2^{5\times 1} \times 2^3 +$$
$$1 \times 2^5 \times 2^{5\times 0} \times 2^3 = 2^{15} + 2^8 < 0.$$

Because $D_{1,1}(O:X:B^1,B^2)<0$ and $D_{1,2}(O:X:B^1,B^2)>0$ the energy point $X=(0,0)$ is "moved" to a new point $X'=(0,1)$. Also since the first component of X is 0 and $D_{1,1}$ is less than zero it follows that the response in the first component is 0, and there is no need to compute $D_{2,1}$.

We now compute $D_{22}(O:X':B^1,B^2) =$ $$C(1,0)\, 2^{H(1,0)}\, 2^{L'\cdot J(X',1)}\, S_1(X',2) + C(2,0)\, 2^{H(2,0)}\, 2^{L'\cdot J(X',2)}\, S_2(X',2) =$$

$$1 \times 2^7 \times 2^{3\times 2} \times 1 + 1 \times 2^{5\times 1} \times 2^{3\times 1} \times 1 > 0.$$

Because $D_{1,2}$ and $D_{2,2}$ are both positive and the second component of the query point X is 0, it follows that the second component of the response is 1; thus we find the response to the query $X=(0,0)$ is $(0,1)$.

The algorithms indicated for the method according to the invention are intended to be implemented on a multiprocessor machine as there is a considerable amount of parallelism.

The pattern matching method according to the preferred embodiment of the present invention is summarized in the following Table:

query pattern, component by component, in dependence upon both a first, global influence of all stored patterns on all components of the first query pattern and a second, particular influence of all stored patterns on each respective component of said first query pattern (steps $(5) \propto (12)$ in the Table).

TABLE

| Step No. | Step Name | Operation | Subscripts |
|---|---|---|---|
| (1) | Store Patterns | $B = b_{i,j}$. | $i = 1, \ldots, n$<br>$j = 1, \ldots, k$ |
| (2) | Define Query | $X = x_i$. | $i = 1, \ldots, n$ |
| (3) | Match Set | $M = m_j$. | $j = 1, \ldots, k$ |
| (4) | Initial Output | $O_j = o_{ij} = x_{ij}$,<br>where $m_j = n$ | $i = 1, \ldots, n$<br>$j = 1, \ldots, k$ |
| (5) | Disturbance | $LM = Lm_j$.<br>Where $2 \leq L \leq 20$<br>$3 \leq L \leq 7$ | $j = 1, \ldots, k$<br>Max. Range,<br>Best range. |
| (5A) | Disturbance with Height | $LM + H(t) = Lm_j + h_j$, | $j = 1, \ldots, k$ |
| (6) | Sign | $Sgn = sgn_{i,j} = 2 b_{i,j} - 1$. | $i = 1, \ldots, n$<br>$j = 1, \ldots, k$ |
| (6A) | Sign with Direction | $C(t) \quad Sgn = c_j sgn_{i,j} = C_j(2 b_{i,j} - 1)$.<br>Where $c_j = +1, -1$ or $0$. | $i = 1, \ldots, n$<br>$j = 1, \ldots, k$ |
| (7) | Magnitude | $Mag = mag_{i,j} = [(logxor (b_{i,j}, x_i) = 1)N:1]$.<br>Where $2 \leq N \leq 20$<br>$3 \leq N \leq 7$ | Max. range,<br>Best range.<br>$i = 1, \ldots, n$<br>$j = 1, \ldots, k$ |
| (8) | Exponent | $Exp = exp_{i,j} = Lm_j + mag_{i,j}$. | $i = 1, \ldots, n$<br>$j = 1, \ldots, k$ |
| (9) | Positive/Negative Sums | For each $i = 1, \ldots, n$ form two sums:<br>Pos. $sum_i = P(exp_{i,j}) + \ldots + P(exp_{i,k})$ for each $(exp_{i,k})$ of $j$ where $sgn_{i,j} > 0$,<br>Neg. $sum_i = P(exp_{i,1}) + \ldots + P(exp_{i,k})$ for each $(exp_{i,k})$ of $j$ where $sgn_{i,j} < 0$. | |
| (10) | Second Query | Form intermediate set $D = d_i$<br>If Pos. $sum_i \geq$ Neg. $sum_i$, then $d_i = 1$;<br>Else $d_i = 0$.<br>Form $X' = x_i' = d_i$. | $i = 1, \ldots, n$ |
| (11) | Intermediate Response | $R = r_i$<br>Where $r_i = x_i$, if $d_i = x_i$, and<br>$r_i =$ set flag, if $d_i = x_i$. | $i = 1, \ldots, n$ |
| (12) | Initialize | Set $X = X'$, $X' = x_i'$,<br>Set $L = L'$, where $L' < L$; | $i = 1, \ldots, n$ |
| (13) | Recompute | Go through steps (3)–(9) forming a new intermediate set $D = d_i$<br>Computations are required only for those components i that had "set flag". | $i = 1, \ldots, n$ |
| (14) | Third Query | For those components that had "set flag";<br>if $d_i' = x_i'$, then $x_i'' = x_i'$, and<br>if $d_i' = x_i'$, then $x_i'' = *$. | |
| (15) | Output | $O = X'' = x_i''$. | $i = 1, \ldots, n$ |

In the pattern matching method set forth in this table a first query pattern, taking the form of a set $X = x_i$, is matched with a plurality of stored data patterns, taking the form of a matrix $B = b_{ij}$, where $i = i, \ldots, n$ is the number of components in each pattern and $j = j, \ldots, k$ is the number of stored patterns. As may be understood from this table, the method comprises the following essential steps:

(a) For each stored data pattern, the number of components which are identical to corresponding components in said first query pattern are counted, thereby forming a set of match numbers $M = m_j$, (steps (1)–(3) in the Table).

(b) If any match number $m_j = n$, then the respective $j^{th}$ stored data pattern is displayed as an output pattern set $O_j = o_{ij}$ indicating a match (step (4) in the Table).

(c) If no match number $m_j = n$, then a second query pattern $X' = x_i'$ is determined by modifying the first query pattern, component by component, in dependence upon both a first, global influence of all stored patterns on all components of the first query pattern and a second, particular influence of all stored patterns on each respective component of said first query pattern (steps $(5) \propto (12)$ in the Table).

(d) Steps (a) and (b) are then repeated using the second query pattern in place of the first query pattern.

(e) If no match number $m_j = n$, a third query pattern $X'' = x_i''$ is determined by modifying the second query pattern, component by component, in dependence upon both a third, global influence of all stored patterns on all components of the second query pattern and a fourth, particular influence of all stored patterns on each respective component of the second query pattern, with the third and fourth influences being less than the first and second influences, respectively (steps (13 and (14) in the Table).

(f) The output pattern $O = o_i$, is then displayed, component by component, with those respective components of the third query pattern that have been modified at most once from the first query pattern (step (15) in the Table).

If desired, those respective components that have been modified twice from the first query pattern may be displayed in the output pattern $O=o_i$ in such a manner as to indicate conflict between the first query pattern and the set of all stored data patterns. For example, these components that have been modified twice may be displayed as an asterisk (*).

The step (c) indicated above preferably comprises the steps of:

(1) multiplying each match number $m_j$ of a match set M by a first disturbance factor L to produce a set LM;

(2) determining a sign matrix Sgn for all components $sgn_{ij}$ by setting each component equal to $-1$ if the corresponding stored pattern component $b_{ij}$ is 0, and to $+1$ if the stored pattern component is 1;

(3) determining a magnitude matrix Mag for all components according to the formula $mag_{ij}=[(\text{logxor}(b_{ij}, x_i)=1) N:1]$, where N is a magnification factor;

(4) determining an exponent matrix $Exp=LM+Mag$ for all components according to the formula $exp_{ij}=Lm_j+mag_{ij}$;

(5) forming the positive and negative sums for all components as follows:

Pos.sum$_i$=P(exp$_{i,1}$) +. . . + P(exp$_{i,k}$) for each (exp$_{i,k}$) of j where sgn$_{i,j}$>0, Neg.sum$_i$=P(exp$_{i,1}$) +. . . + P(exp$_{i,k}$) for each (exp$_{i,k}$) of j where sgn$_{i,j}$<0 and (6) determining a second query pattern set $X'=x_i'$ for all i as follows:

if Pos. sum$_i \leq$ Neg. sum$_i$, then $x_i'=1$, else $x_i'=0$.

Thereafter, a response set $R=r_i$ is determined for all i as follows:

$r_i = x_i$, if $x_i' = x_i$, and $r_i = $ set flag, if $x_i' = x_i$.

Similarly, step (e) indicated above preferably includes the steps (1) through (6) using a second disturbance factor L' which is less than the first disturbance factor L for those components i that have a set flag.

According to a preferred embodiment of the present invention, the height factor set $H=h_j$ is associated with the components of each stored pattern $b_{ij}$, each height factor component $h_j$ being indicative of the relative importance of each stored pattern with respect to the other stored patterns. This height factor set H is added to the set LM for purposes of determining the matrix Exp.

The height factor components $h_j$ may be a function of time and are also preferably an integer, such as $-1, 0, 1, 2$, etc.

According to a further preferred embodiment of the present invention a sign factor set $C=c_j$ is associated with the components of each stored pattern $b_{ij}$. Each sign factor component $c_j$ is indicative of whether the pattern component is to be sought, avoided or ignored. The sign factor set C is multiplied by the sign matrix Sgn for the purposes of determining the positive and negative sums.

Some or all of the sign factor components $c_j$ may be a function of time. These sign factor components $c_j$ are preferably the integer values $+1, 0$ and $-1$.

The maximum range for the first disturbance factor L is approximately 2 to 20; the best range for this factor L is 3 to 7. For example, the first disturbance factor L may be chosen to be 3 while the second disturbance factor L' is chosen to be 2.

The maximum range for the magnification factor N is 2 to 20 with the best range of values 3 to 7. For example, the magnification factor may be chosen as 3.

In conclusion, the method of matching a first query pattern, represented by the set X, with a plurality of stored data patterns, represented by the matrix B, is accomplished by approximating the surface in vector space defined by the stored patterns by a Bernstein Polynomial. This approximation makes it possible to compute the derivative of the surface in all directions at the query point. It is thus possible to determine a new query point by proceeding in the direction of positive slope (derivative) and in the opposite direction of a negative slope (derivative).

A preferred embodiment and best mode of a LIST computer program which implements the present invention is set forth in the attached Appendix.

There has thus been shown and described a novel dynamic pattern matcher which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

APPENDIX

```
;;; -*- Mode: LISP; Syntax: Common-lisp; Package: USER; Base: 10 -*-

;(defmacro flip (x)
;   `(cond ((= ,x 0) 1)
;         (t 0)))

(defflavor box-mouse-sensitive-items-mixin
        ((item-list nil)
         (sensitive-item nil)
         (item-blinker))
        ()
   (:required-flavors tv:sheet)
   (:settable-instance-variables item-list))

(defstruct (item)
   left
```

```
top
right
bottom
(state 0)
name)

(defmethod (box-mouse-sensitive-items-mixin :after :init) (ignore)
  (setq item-blinker
        (tv:make-blinker self 'tv:hollow-rectangular-blinker :visibility nil)))

(defmethod (box-mouse-sensitive-items-mixin :find-items) (rc-list)
  (loop for item in item-list
        nconc
        (and (member (item-name item) rc-list :test #'equal)
             (list item))))

(defmethod (box-mouse-sensitive-items-mixin :make-item)
           (name left top right bottom)
  (let ((item (make-item :left left
                         :top top
                         :right right
                         :bottom bottom
                         :name name)))
    (push item item-list)
    (tv:mouse-wakeup)
    item))

(defmethod (box-mouse-sensitive-items-mixin :print-item-content)
           (&optional (stream *terminal-io*))
  (loop for item in item-list
        for left = (item-left item)
        for top = (item-top item)
        for right = (item-right item)
        for bottom = (item-bottom item)
        for state = (item-state item)
        for name = (item-name item)
        do
    (format stream "~%name = ~D left = ~D top = ~D right = ~D bottom = ~D state = ~D"
            name left top right bottom state)))

(defmethod (box-mouse-sensitive-items-mixin :remove-item) (item)
  (setq item-list (delq item item-list))
  (tv:mouse-wakeup))

(defmethod (box-mouse-sensitive-items-mixin :remove-all) ()
  (setq item-list nil)
  (tv:mouse-wakeup))

(defmethod (box-mouse-sensitive-items-mixin :reset-state) ()
  (loop for item in item-list
        do
    (setf (item-state item) 0)))

;; Note this function uses the current item-list order and to generate a linear bit vector
;; item-list order cannot be alter!!!!
(defmethod (box-mouse-sensitive-items-mixin :make-item-state-array) ()
  (let* ((l (length item-list))
         (state-array (make-array l :element-type '(unsigned-byte 1))))
    (declare (sys:array-register state-array))
    (loop for item in item-list
          for index downfrom (1- l)
          do
      (setf (bit state-array index) (item-state item)))
    state-array))

;(defun foo (row-index col-index lst dir)
;  (let* ((max-row-index 4)
;         (max-col-index 4)
;         (no-rows (1+ max-row-index))
;         (no-cols (1+ max-col-index)))
;    (loop for c from 0 to max-row-index
;          collect
;            (loop for r from 0 to max-col-index
;                  collect
;                    (case dir
;                      (:row (nth (+ (* c no-rows) r) lst))
;                      (:col (nth (+ c (* r no-cols)) lst)))))))

;(defun test (no-rows no-cols lst dir)
;  (loop for c from 0 below no-rows
;        collect
;          (loop for r from 0 below no-cols
;                collect
;                  (case dir
;                    (:row (nth (+ (* c no-rows) r) lst))
;                    (:col (nth (+ c (* r no-cols)) lst))))))

;(defun bar (lst)
;  (let ((ll (length (car lst))))
;    (loop for i in lst
```

```
;               nconc
;                  (loop for k from 0 below (1- 11) by 2
;                     collect
;                        (let ((counter 0))
;                           (if (dotimes (c 3 (if (2 counter 2) t nil))
;                                  (and (= (nth (+ c k) i) 1) (incf counter)))
;                              1
;                              0)))))))

;(defun xx (item-list no-rows no-cols &optional (type :row))
;   (let ((ril (reverse item-list))
;         outer-loop-count inner-loop-count)
;      (case type
;         (:row (setq outer-loop-count no-rows)
;               (setq inner-loop-count no-cols))
;         (:col (setq outer-loop-count no-cols)
;               (setq inner-loop-count no-rows)))
;      (loop for c from 0 below outer-loop-count
;            collect
;               (loop for r from 0 below inner-loop-count
;                     collect
;                        (nth (case type
;                                (:col (+ (* r outer-loop-count) c))
;                                (:row (+ (* c outer-loop-count) r))) ril)
;                        ;;(item-state (nth (+ (* c outer-loop-count) r) ril))
;                        ))))

(defun-method get-list box-mouse-sensitive-items-mixin (no-rows no-cols &optional (type :row))
   (let ((ril (reverse item-list))
         outer-loop-count inner-loop-count)
      (case type
         (:row (setq outer-loop-count no-rows)
               (setq inner-loop-count no-cols))
         (:col (setq outer-loop-count no-cols)
               (setq inner-loop-count no-rows)))
      (loop for c from 0 below outer-loop-count
            collect
               (loop for r from 0 below inner-loop-count
                     collect
                        (item-state (nth (case type
                                            (:col (+ (* r outer-loop-count) c))
                                            (:row (+ (* c outer-loop-count) r))) ril))
                        ))))

(defun-method compress-rule box-mouse-sensitive-items-mixin (lst)
   (let ((ll (length (car lst))))
      (loop for i in lst
            nconc
               (loop for k from 0 below (1- ll) by 2
                     collect
                        (let ((counter 0))
                           (if (dotimes (c 3 (if (2 counter 2) t nil))
                                  (and (= (nth (+ c k) i) 1) (incf counter)))
                              1
                              0)))))))

(defun make-col-list (list no-rows no-cols)
   (loop for c from 0 below no-rows
         collect
            (loop for r from 0 below no-cols
                  collect
                     (nth (+ c (* r no-rows)) list))))

(defun make-rc-list (list no-rows no-cols &key (type :col))
   (let (outer-loop-count inner-loop-count)
      (case type
         (:row (setq outer-loop-count no-rows)
               (setq inner-loop-count no-cols))
         (:col (setq outer-loop-count no-cols)
               (setq inner-loop-count no-rows)))
      (loop for c from 0 below outer-loop-count
            collect
               (loop for r from 0 below inner-loop-count
                     collect
                        (nth (case type
                                (:col (+ (* r outer-loop-count) c))
                                (:row (+ (* c outer-loop-count) r))) list)))))

(defmethod (box-mouse-sensitive-items-mixin :compress) (type)
   (let* ((size (item-name (car item-list)))
          (no-rows (1+ (car size)))
          (no-cols (1+ (cdr size)))
          (compress-rows (1+ (floor (/ no-rows 3))))
          (compress-cols (1+ (floor (/ no-cols 3))))
          (compress-rc-vector (make-array (* compress-rows compress-cols)
                                          :element-type '(unsigned-byte 1)))
          compress-list outer-loop-count inner-loop-count)
      (declare (special compress-rc-vector))
      (print (make-rc-list
                (compress-rule (get-list no-rows no-cols :col))
                compress-rows no-cols :type :row) )
```

```
        (setq compress-list
              (if (eq type :col)
                  (print (compress-rule (make-rc-list
                                         (compress-rule (get-list no-rows no-cols :row))
                                         no-rows compress-cols :type :col)))
                  ;; the following code is wrong
                  (print (compress-rule (make-rc-list
                                         (compress-rule (get-list no-rows no-cols :col))
                                         compress-rows no-cols :type :row)))))
        (case type
          (:row (setq outer-loop-count compress-rows)
                (setq inner-loop-count compress-cols))
          (:col (setq outer-loop-count compress-cols)
                (setq inner-loop-count compress-rows)))
        (loop for c from 0 below outer-loop-count
              do
           (loop for r from 0 below inner-loop-count
                 do
              (setf (bit compress-rc-vector (case type
                                              (:col (+ c (* r outer-loop-count)))
                                              (:row (+ r (* c outer-loop-count)))))
                    (pop compress-list))))
        compress-rc-vector))

(defwhopper (box-mouse-sensitive-items-mixin :handle-mouse) ()
  (unwind-protect
      (continue-whopper)
    (setq sensitive-item nil)
    (send item-blinker :set-visibility nil)))

(defmethod (box-mouse-sensitive-items-mixin :who-line-documentation-string) ()
  (zl:string
    "L:Toggle Bit, L-2:Clear Pad Grid M(Hold):Draw, R(Hold):Erase, Ctl-L:Save, Meta-L:Run Super-L: Run NN
"))
;  (when sensitive-item (item-documentation sensitive-item)))

(defmethod (box-mouse-sensitive-items-mixin :mouse-sensitive-item) (x y)
  (decf x (send self :left-margin-size))
  (decf y (send self :top-margin-size))
  (setq sensitive-item
        (dolist (item item-list)
          (when (and (≥ y (item-top item))
                     (< y (item-bottom item))
                     (≥ x (item-left item))
                     (< x (item-right item)))
            (return item)))))

(defmethod (box-mouse-sensitive-items-mixin :mouse-moves) (x y)
  (tv:mouse-set-blinker-cursorpos)
  ;; See if the mouse is inside an item
  (let ((item (send self :mouse-sensitive-item x y)))
    (cond (;; It is, turn on the blinker
           (not (null item))
           (let ((left (item-left item))
                 (top (item-top item))
                 (right (item-right item))
                 (bottom (item-bottom item)))
             (send item-blinker :set-cursorpos left top)
             (send item-blinker :set-size (- right left) (- bottom top))
             (send item-blinker :set-visibility t)))
          ;; It's not on an item, turn off the blinker.
          (t (send item-blinker :set-visibility nil)))))

;(defmethod (box-mouse-sensitive-items-mixin :mouse-click) (button x y)
;  (let ((item (send self :mouse-sensitive-item x y)))))

(defflavor sensitive-pad-mixin ((row nil) (col nil))
           ()
  (:required-flavors box-mouse-sensitive-items-mixin tv:graphics-mixin tv:window)
  :settable-instance-variables)

(defmethod (sensitive-pad-mixin :make-sensitive-area)
           (pad-width pad-height)

;; The order of the loop is extremely important!!
  ;; It determines the scanning of the grid from left to
  ;; right and top to bottom is how is done now..

(send self :remove-all)
  (loop for r from 0 below row
        for top from 0 by pad-height
        do
     (loop for c from 0 below col
           for left from 0 by pad-width
           do
        (send self :make-item (cons r c) left top (+ left pad-width) (+ top pad-height)))))

(defmethod (sensitive-pad-mixin :draw-grid)
           (&optional (make-sensitive-areas t)
```

```
                            (erase-content t)
                     &aux pad-width pad-height grid-width grid-height)
  (when erase-content
    (send self :expose)
    (send self :clear-window))
  (multiple-value-bind (width height) (send self :inside-size)
    (setq pad-width  (floor (/ width col)))
    (setq pad-height (floor (/ height row)))
    (setq grid-width  (* col pad-width))
    (setq grid-height (* row pad-height))
    (loop for c from 0 to row
          for y from 0 by pad-height
          do
      (if (≥ y height) (decf y))
      (send self :draw-line 0 y grid-width y tv:alu-seta))
    (loop for r from 0 to col
          for x from 0 by pad-width
          do
      (if (≥ x width) (decf x))
      (send self :draw-line x 0 x grid-height tv:alu-seta))
    (if make-sensitive-areas
        (send self :make-sensitive-area pad-width pad-height))))

(defun draw-pattern (row col pattern-array window &optional (size nil) (from-x 0) (from-y 0)
                         &aux box-width box-height alu (draw-half nil) (dim -1)
                              (p pattern-array))
  (declare (sys:array-register p))
  (multiple-value-bind (width height) (if (null size) (send window :inside-size)
                                          (apply #'values size))
    (setq box-width  (floor (/ width col)))
    (setq box-height (floor (/ height row)))
    (loop for c from 1 to row
          for top from from-y by box-height
          do
      (loop for r from 1 to col
            for left from from-x by box-width
            do
        (case (bit p (incf dim))
          ((1 t) (setq alu tv:alu-seta))
          ((0 nil) (setq alu tv:alu-andca))
          (* (setq draw-half t)))
        (if (not draw-half)
            (send window :draw-rectangle box-width box-height (1+ left) (1+ top) alu)
            (send window :draw-rectangle
                  (floor (/ box-width 2))
                  (floor (/ box-height 2))
                  (+ left (floor (/ box-width 4)))
                  (+ top (floor (/ box-height 4)))
                  tv:alu-seta)
            (setq draw-half nil))))))

;;(setq foo (tv:make-window 'tv:window :edges-from :mouse :blinker-p nil))

(defflavor stored-patterns-pane (input-pattern-stream state-list garys-state-list height-list)
           (box-mouse-sensitive-items-mixin sensitive-pad-mixin
            tv:graphics-mixin tv:pane-mixin tv:window)
  :settable-instance-variables)

(defmethod (stored-patterns-pane :who-line-documentation-string) ()
  (zl:string "L-2:Delete, Ctl-L:Modify"))

(defmethod (stored-patterns-pane :divide-storage-boxes) (s-row s-col)
  (send self :set-row s-row)
  (send self :set-col s-col)
  (send self :draw-grid t))

(defmethod (stored-patterns-pane :update-state-and-height-list) ()
  (setq state-list nil)
  (setq garys-state-list nil)
  (setq height-list nil)
  (loop for i in item-list
        for state = (item-state i)
        for h = (item-name i)
        do
    (when (typep state 'array)
      (setq state-list (cons state state-list))
      (setq height-list (cons h height-list))))
  (setq garys-state-list (mapcar 'convert-to-one state-list)))

(defun-method edit-pattern stored-patterns-pane (item-state window)
  (let ((item-array item-state)
        (ip-items (reverse (send window :item-list))))
    (declare (sys:array-register item-array))
    (send window :reset-state)
    (send window :clear-window)
    (send window :draw-grid nil)
    (loop for i in ip-items
          for index from 0
          do
      (if (= (bit item-array index) 1)
          (send window :update-item i :draw)))))
```

```
(defmethod (stored-patterns-pane :mouse-click) (button x y)
  (let ((item (send self :mouse-sensitive-item x y))
        (ip (send self :input-pattern-stream)))
    (cond ((eql button #\c-mouse-L-1)
           (edit-pattern (item-state item) ip)
           t)
          ((eql button #\mouse-L-2)
           (let ((left (item-left item))
                 (top (item-top item))
                 (right (item-right item))
                 (bottom (item-bottom item)))
             (setf (item-state item) 0)
             (setf (item-name item) 0)
             (send self :draw-rectangle (- right left 1) (- bottom top 1)
                   (1+ left) (1+ top) tv:alu-andca))
           (send self :update-state-and-height-list)   ;this should be changed to :after for
                                                       ; maintance sake!!
           t)
          (t t))))

;(defmethod (stored-patterns-pane :after :refresh ) ()
;  (send self :draw-grid nil))

;(defflavor bernstein-flavor (store-patterns-array-and-heigh-list) ()
;  :setttable-instance-variables)

(defflavor input-pattern-pane (store-patterns-stream
                                (pen-box-l 1)
                                (pen-box-h 1))
     (box-mouse-sensitive-items-mixin sensitive-pad-mixin
      tv:graphics-mixin tv:pane-mixin tv:window)
  :settable-instance-variables)

(defun-method update-one-item input-pattern-pane (item type)
  (let ((left (item-left item))
        (top (item-top item))
        (right (item-right item))
        (bottom (item-bottom item))
        (state (item-state item))
        alu)
    (setf (item-state item) (case type
                              (:toggle (and (setq alu tv:alu-xor) (flip state)))
                              (:draw (and (setq alu tv:alu-seta) 1))
                              (:erase (and (setq alu tv:alu-andca) 0))))
    (send self :draw-rectangle
          (- right left 1) (- bottom top 1) (1+ left) (1+ top) alu)))

(defmethod (input-pattern-pane :reverse-pad) ()
  (loop for item in (send self :item-list)
        do
        (update-one-item item :toggle)))

(defmethod (input-pattern-pane :collect-update-boxes) (cbi)
  (let ((row-index (car cbi))
        (col-index (cdr cbi)))
    (send self :find-items
          (loop for i from row-index below (+ row-index pen-box-l)
                nconc
                (loop for j from col-index below (+ col-index pen-box-h)
                      collect
                      (cons i j))))))

(defmethod (input-pattern-pane :update-item) (item type)
  (let ((current-row-col-index (item-name item)))
    (dolist (item (send self :collect-update-boxes current-row-col-index))
      (update-one-item item type))))

(defmethod (input-pattern-pane :store-pattern) ()
  (let ((sp (send self :store-patterns-stream))
        (p-row (send self :row))
        (p-col (send self :col))
        (pattern-array (send self :make-item-state-array))
        stored-pad-item left top)
    (setq stored-pad-item (loop for i in (reverse (send sp :item-list))
                                thereis (and (numberp (item-state i)) i)))
    (setq left (item-left stored-pad-item))
    (setq top (item-top stored-pad-item))
    (setf (item-state stored-pad-item) pattern-array)
    (setf (item-name stored-pad-item) 3)        ;default height
    (draw-pattern p-row p-col pattern-array sp
                  (list (- (item-right stored-pad-item) left)
                        (- (item-bottom stored-pad-item) top))
                  left top)
    (send sp :draw-grid nil nil)))

(defmethod (input-pattern-pane :after :store-pattern) ()
  (let ((sp (send self :store-patterns-stream)))
    (send sp :update-state-and-height-list)))

(defmethod (input-pattern-pane :mouse-click) (button x y)
```

```
(let ((item (send self :mouse-sensitive-item x y)))
  (cond ((and item (eql button #\mouse-L-1))
         (update-one-item item :toggle)
         t)
        ((eql button #\mouse-L-2)
         (when (and row col)
           (send self :draw-grid nil)
           (send self :reset-state)
           t))
        ((eql button #\c-mouse-L-1)
         (send self :store-pattern)
         t)
        ((eql button #\m-mouse-L-1)
         ;;(process-run-function "Run Berstein"
         ;;#'(lambda ()
         (let ((sp (send self :store-patterns-stream))
               (op (send (send self :superior) :get-pane 'output-pattern))
               (lisp (send (send self :superior) :get-pane 'lisp)))
           (send lisp :clear-window)
           (send op :clear-window)
           (draw-pattern row col
                        (top-level (send self :make-item-state-array)
                                   (send sp :state-list) (send sp :height-list)
                                   lisp)
                        op)))
        ((eql button #\super-mouse-L-1)
         ;;(process-run-function "Run Berstein"
         ;;#'(lambda ()
         (let ((sp (send self :store-patterns-stream))
               (op (send (send self :superior) :get-pane 'output-pattern))
               (lisp (send (send self :superior) :get-pane 'lisp)))
           (send lisp :clear-window)
           (send op :clear-window)
           (draw-pattern row col
                        (garys-top-level (send self :make-item-state-array)
                                         (send sp :garys-state-list)
                                         lisp)
                        op)))
         ;;))
        (t t))))

(defwhopper (input-pattern-pane :mouse-moves) (x y)
  (let ((item (send self :mouse-sensitive-item x y))
        (button (tv:mouse-buttons)))
    (cond ((and item (member button '(2 4)))
           (and (= button 2) (update-one-item item :draw))
           (and (= button 4) (update-one-item item :erase))
           t)
          (t nil)))
  (continue-whopper x y))

(defflavor output-pattern-pane ()
          (tv:pane-mixin tv:window))

(defflavor lisp-pane ()
          (tv:lisp-listener-pane tv:window))

(defflavor interface ()
          (tv:borders-mixin tv:bordered-constraint-frame-with-shared-io-buffer)
  :settable-instance-variables
  (:default-init-plist
    :panes
    '((stored-patterns stored-patterns-pane
                       :label ,(zl:string "Stored Patterns")
                       :blinker-p nil
                       :save-bits t)
      (input-pattern input-pattern-pane
                     :label ,(zl:string "Input Pad")
                     :blinker-p nil
                     :save-bits t)
      (output-pattern output-pattern-pane
                      :label ,(zl:string "Output Display")
                      :blinker-p nil
                      :save-bits t)
      (lisp lisp-pane))
    :configurations
    '((main (:layout
             (main :column stored-patterns middle lisp)
             (middle :row input-pattern output-pattern))
            (:sizes
             (main (stored-patterns 0.50)
                   :then (middle 0.50)
                   :then (lisp :even))
             (middle (input-pattern :0.5)
                     :then (output-pattern :even)))))
    :configuration 'main))

(defmethod (interface :after :init) (&rest ignore)
  (let ((sp (send self :get-pane 'stored-patterns))
        (ip (send self :get-pane 'input-pattern)))
    (send sp :set-input-pattern-stream ip)
    (send ip :set-store-patterns-stream sp)))
```

```lisp
(setq foo (tv:make-window 'interface :blinker-p nil :edges-from :mouse))

(setq bar (tv:make-window 'interface :blinker-p nil :edges-from :mouse))

(defvar *store-array-list* nil)
(defvar *store-height-list* nil)
(defvar *pattern-row-col* nil)

(defun save (file window-frame)
  (let ((sp (send window-frame :get-pane 'stored-patterns))
        (ip (send window-frame :get-pane 'input-pattern)))
    (sys:dump-forms-to-file (fs:parse-pathname file)
                            '((setq *store-array-list* ',(send sp :state-list))
                              (setq *store-height-list* ',(send sp :height-list))
                              (setq *pattern-row-col* ',(cons (send ip :row)
                                                              (send ip :col)))))))

(defun retrieve (file window-frame)
  (let ((sp (send window-frame :get-pane 'stored-patterns))
        (ip (send window-frame :get-pane 'input-pattern)))
    (when (y-or-n-p "Has the Store Pattern area been setup? ")
      (load (fs:parse-pathname file))
      (send ip :set-row (car *pattern-row-col*))
      (send ip :set-col (cdr *pattern-row-col*))
      (send ip :draw-grid)
      (loop for p in *store-array-list*
            for h in *store-height-list*
            for pa in (reverse (send sp :item-list))
            for left = (item-left pa)
            for top = (item-top pa)
            do
         (setf (item-state pa) p)
         (setf (item-name pa) h)
         (draw-pattern (car *pattern-row-col*) (cdr *pattern-row-col*) p sp
                       (list (- (item-right pa) left)
                             (- (item-bottom pa) top))
                       left top))
      (send sp :draw-grid nil nil)
      (send sp :set-state-list *store-array-list*)
      (send sp :set-garys-state-list
            (loop for e in (send sp :state-list)
                  collect
                     (convert-to-one e)))
      (send sp :set-height-list *store-height-list*))))

;(defun tes ()
;  (cl:time
;    (loop for i from 0 to 1000 do
;       (+ 1 i))
;    ))
;;; -*- Mode: LISP; Syntax: Common-lisp; Package: USER; Base: 10 -*-

(defun make-q-array (length initial-contents)
  (make-array length :element-type '(unsigned-byte 1) :initial-con  \ initial-contents
              :fill-pointer t))

(defmacro closeness-count (pattern-length q store-vectors-list)
  '(loop for store-vector in ,store-vectors-list
         collect
            (let ((s store-vector))
              (declare (sys:array-register s))
              (loop for i from 0 below ,pattern-length
                    count (eq (bit ,q i) (bit s i))))))

(defun sum-1st-and-2nd-terms (pattern-length closeness-list disturb-factor store-height-list)
  pattern-length
  (loop for i in closeness-list
        for j in store-height-list
        collect
           ;;(if (= pattern-length i) nil
           (+ (* i disturb-factor) j)
              ;;)
           ))

(defmacro sum-third-term-aux (sum-value q b)
  '(values ,b                                       ;b is 1 then it's positive
         (if (= (logxor ,q ,b) 1) (+ ,sum-value 3) ,sum-value)))

(defmacro flip (x)
  '(cond ((= ,x 0) 1)
         (t 0)))

(defun add-bits (on-bits-list on-bit)
  (loop for mem-list = (member on-bit on-bits-list)
        until (and (null mem-list) (push on-bit on-bits-list) (return on-bits-list))
        do
```

```
    (setq on-bits-list (remove on-bit on-bits-list))
    (setq on-bit (1+ on-bit)))))

(defun d-index-new (q-value stored-vectors-list sum-value-list dim-index)
                                 &optional (window pp))
  (let ((pos-sum nil)
        (neg-sum nil)
        exact-match)
    (setq exact-match
          (loop for b in stored-vectors-list
                for b-value = (bit b dim-index)
                for s-value in sum-value-list
                do
             (if (null s-value)
                 (return b)
                 (multiple-value-bind (bucket vs123)
                     (sum-third-term-aux s-value q-value b-value)
                   (case bucket
                     (1 (setq pos-sum (add-bits pos-sum vs123)))
                     (0 (setq neg-sum (add-bits neg-sum vs123))))))))
    ;;(print exact-match 11)
    ;;(if exact-match
    ;;exact-match
        (loop for max-pos = (if (null pos-sum) -1 (apply #'max pos-sum))
              for max-neg = (if (null neg-sum) -1 (apply #'max neg-sum))
              until (or (and (= -1 max-pos max-neg) (return nil))
                        (and (= max-pos max-neg)
                             (if (> max-pos max-neg) (return 1) (return 0)))).
              do
           (setq pos-sum (delete max-pos pos-sum))
           (setq neg-sum (delete max-neg neg-sum)))
        ;;)
    ))

(defun d-dimensions (pattern-length query-array-vector stored-vector-list
                                    disturb-factor stored-height-list   result-array
                                    &optional (process-index-list nil))
  (let ((r result-array)
        (q query-array-vector)
        s-1-2)
    (declare (sys:array-register r q))
    (setq s-1-2 (sum-1st-and-2nd-terms pattern-length
                                 (closeness-count pattern-length q stored-vector-list)
                                 disturb-factor stored-height-list))
    ;;(print s-1-2 11)
    (if process-index-list
        (loop for i in process-index-list
              for pre-bit-value = (bit r i)
              for qbit-value = (bit q i)
              for d-value = (d-index-new qbit-value stored-vectors-list s-1-2 i)
              until (and (typep d-value 'array) (return d-value))
              do
           ;;(break "in process-index-list")
           ;;(format 11 "-% d-value = -D" d-value)
           (if (= (logxor pre-bit-value
                          d-value)
                  1)
               (setf (bit r i) '*))))
    (setq process-index-list
          (loop for i from 0 below pattern-length
                for pre-bit-value = (bit r i)
                for qbit-value = (bit q i)
                for d-value = (d-index-new qbit-value stored-vector-list s-1-2 i)
                ;;do (format t "-% d-value = -D" d-value)
                until (and (typep d-value 'array) (return d-value))
                nconc
                   (when (= (logxor pre-bit-value d-value)
                            1)
                     (setf (bit r i) (flip pre-bit-value))
                     (list i))))
    (values r process-index-list)))

(defun top-level (query-array-vector stored-vector-list stored-height-list
                                     &optional (window t))
  (let ((pattern-length (array-total-size query-array-vector))
        result-array
        process-index-list)
    (setq result-array (make-array pattern-length ))
    (copy-array-contents query-array-vector result-array)
    (format window "-% First iteration!!")
    (multiple-value-setq (result-array process-index-list)
      (d-dimensions pattern-length query-array-vector stored-vector-list 5
                    stored-height-list result-array))
    (when (and process-index-list (listp process-index-list))
      (format window "-% Second iteration!!")
      (format window "-% process-index-list = -S" process-index-list)
      (d-dimensions pattern-length result-array stored-vector-list 3
                    stored-height-list result-array process-index-list))
    result-array))
```

```
                                      DBA    REPORT
HQ AFESC/DEC           PREPARED BY:                         DATE: 07/27/
PROGRAM ID:  AFLC      PROJECT ID:  ROBIN                   FACILITY ID:  F15
RUN NUMBER:  01        SET NUMBER:  01                      LCC RUN NUMBER: 06
                       COSTS CALCULATED ARE:   CONSTANT $
================================================================================
================================================================================

YEARLY CONSTANT $ ENERGY & CLEANING VALUES
DESCRIPTION         COST              QTY         ENERGY TYPE
CLEANING ==>        1310
HEATING  ==>        13026             304         NAT GAS
A/C      ==>        14                114         ELECTRIC
FNS/LGHTS==>        16                130         ELECTRIC
USER DEF1==>
USER DEF2==>
USER DEF3==>
USER DEF4==>
```

DELETE ESTIMATE DATA

Initial menu item "8" is selected to delete estimate data. CCMAS tells a user how data may be deleted, then asks for the CCMAS-ID.

DATA CAN BE DELETED BY ENTERING:

CCMAS-ID; CCMAS-ID AND RUN #; OR CCMAS-ID, RUN# AND SET#:

ENTER PROGRAM, PROJECT, FACILITY-ID (CCMAS-ID):

ENTER RUN NUMBER:

If the user inputs a <CR> instead of a run number CCMAS responds:

DO YOU WANT TO DELETE ALL ESTIMATE DATA FOR:
    CCMAS-ID: XXXXXXXXXX

If the user inputs a run number, CCMAS responds:

ENTER SET NUMBER:

If the user inputs a <CR> instead of a set number CCMAS responds:

DO YOU WANT TO DELETE ALL ESTIMATE DATA FOR:
    CCMAS-ID: XXXXXXXXXX
    RUN NUMBER:        X

If the user enter a set number CCMAS responds:

DO YOU WANT TO DELETE ALL ESTIMATE DATA FOR:
    CCMAS-ID: XXXXXXXXXX
    RUN NUMBER:        X
    SET NUMBER:        X

A "No" response to the DO YOU WANT TO DELETE ALL ESTIMATE DATA FOR: returns the user to the previous data input. To a "YES" reply, CCMAS responds:

DATA WILL BE DELETED
    DELETING ESTIMATE DATA FOR:
    CCMAS-ID: XXXXXXXXXX
    RUN NUMBER:        X (If Specified)
    SET NUMBER:        X (If Specified)

DATA DELETED

The user is then returned to the initial menu.

What is claimed is:

1. A method of comparing, with the aid of a computing system, a query pattern with a set of stored patterns, said method comprising the steps of:
   a) creating a library of stored patterns in a desired format wherein each pattern comprises a set of elements, each pattern having a relative time-dependent importance/avoidance property;
   b) presenting a query pattern comprising a set of elements representative of the entity to be matched in the same size and format as the stored patterns;
   c) comparing the query pattern with each of the stored patterns, on an element-by-element basis and determining a first degree of match for each stored pattern;
   d) indicating a complete match if one exists;
   e) creating, if no complete match exists, a derived query pattern having the same number of elements as the original query pattern and the stored patterns, said derived query pattern being created as follows:
   1) determining a set of first change numbers D according to the following formula:

$$D_{1J}[i]: X : B^1, \ldots, B^k) = C(1,t)P^{H(1,t)} [P^{L,J(X,1)}] S_1(X,i) + C(2,t)P^{H(2,t)} [P^{L,J(X,2)}] S_2(X,i) + \ldots + C(k,t)P^{H(k,t)} [P^{L,J(X,k)}] S_k(X,i)$$

where:
   $D_{1\,i}$ is the first change number for the $i^{th}$ element of the query pattern,
   t indicates a function of time,
   C(i,t) is the algebraic sign of the relative importance property at time t of stored pattern $B^i$,
   $P^{h(i,t)}$ is the magnitude of the relative importance property of stored pattern $B^i$ at time t,
   J(X,i) is the degree of match with stored pattern $B^i$,
   ($S_z(X,i)$) is:
   — 1 if the $i^{th}$ element of $B^z$ and the $i^{th}$ element of X are both 0;
   1 if the $i^{th}$ element of $B^z$ and the $i^{th}$ element of X are both 1;
   $-p^3$ if the $i^{th}$ element of $B^z$ is 0 and the $i^{th}$ element of X is 1;
   $p^3$ if the $i^{th}$ element of $B^z$ is 1 and the $i^{th}$ element of X is 0,
   2) setting the value of the $i^{th}$ element of the derived query pattern at 1 if the value of the $i^{th}$ element of the query pattern is 1 and the first change number for the $i^{th}$ element is positive;
   3) setting the value of the $i^{th}$ element of the derived query pattern at 1 if the value of the $i^{th}$ element of the query pattern is 1 and the first change number for the $i^{th}$ element is zero;
   4) setting the value of the $i^{th}$ element of the derived query pattern at 0 if the value of the $i^{th}$ element of the query pattern is 1 and the first change number for the $i^{th}$ element is negative;
   5) setting the value of the $i^{th}$ element of the derived query pattern at 1 if the value of the $i^{th}$ element of the query pattern is 0 and the first change number for the $i^{th}$ element is positive;
   6) setting the value of the $i^{th}$ element of the derived query pattern at 0 if the value of the $i^{th}$ element of the query pattern is 0 and the first change number for the $i^{th}$ element is zero;
   7) setting the value of the $i^{th}$ element of the derived query pattern at 0 if the value of the $i^{th}$ element of the query pattern is 0 and the first change number for the $i^{th}$ element is negative;
   f) comparing the derived query pattern with each of the stored patterns, on an element by element basis and determining a second degree of match;
   g) indicating an answer pattern, said answer pattern being the derived query pattern if a complete match exists between the derived query pattern and a stored pattern,
   h) creating, if no complete match exists, an answer pattern having the same number of elements as the derived query pattern and the stored patterns, said answer pattern being created as follows:
   1) determining a set of second change numbers $D_2$ according to the following formula:

$$D_{2J}[i]: X' : B^1, \ldots, B^k) = C(1,t)P^{H(1,t)} [P^{L'J(X',1)}] S_1(X',i) + C(2,t)P^{H(2,t)} [P^{L'J(X',2)}] S_2(X',i) + \ldots + C(k,t)P^{H(k,t)} [P^{L'J(X',k)}] S_k(X',i)$$

where:
   $D_{2\,i}$ is the second change number for the $i^{th}$ element of the query pattern,
   t indicates a function of time,
   C(i,t) is the algebraic sign of the relative importance property (or zero) of the stored pattern $B^i$ at time t,
   $P^{H(i,t)}$ is the magnitude of the relative importance property of stored pattern $B^i$,
   J(X',i) is the second degree of match $B^i$ and X,
   $S_z(X',1)$ is:
   — 1 if the element of $B^z$, and the $i^{th}$ element of X' are both 0;
   1 if the $i^{th}$ element of $B^z$ and the $i^{th}$ element of X' are both 1;
   $-P^3$ if the $i^{th}$ element of $B^z$ is 0 and the $i^{th}$ element of X' is 1; $P^3$ if the $i^{th}$ element of $B^2$ is 1 and the $i^{th}$ element of X' is 0,
   2) setting the value of the $i^{th}$ element of the answer pattern at 1 if the value of the $i^{th}$ element of the query pattern is 0 and both the first change number and the second change number for the $i^{th}$ element are positive;
   3) setting the value of the $i^{th}$ element of the answer pattern at 0 if the value of the $i^{th}$ element of the query pattern is 1 and both the first change number and the second change number for the $i^{th}$ element are negative;
   4) setting the value of the $i^{th}$ element of the answer pattern at 0 if the value of the $i^{th}$ element of the query pattern is 0 and the first change number for the $i^{th}$ element is negative;

5) setting the value of the $i^{th}$ element of the answer pattern at 1 if the value of the $i^{th}$ element of the query is 1 and the first change number is positive;

6) setting the value of the $i^{th}$ element of the answer pattern at *, where * indicates ambiguity, if the value of the $i^{th}$ element of the query pattern is 0, the first change number for the $i^{th}$ element is positive and the second change number is negative; and setting the value of the $i^{th}$ element of the answer pattern at * if the value of the $i^{th}$ element of the query pattern is 1, the first change number is negative and the second change number for the $i^{th}$ element is positive; and i) converting answer pattern from representational format to desired format with ambiguous elements distinguished from determined elements in some manner.

2. A method, using a computing system, for calculating the similarity between a first pattern, called a "query pattern", and at least one of a library of k second patterns, called "stored patterns," the query pattern being representative of a physical entity and being represented by a first sequence of successive feature elements $X=(X_1, X_2, \ldots, X_i, \ldots, X_n)$ where n equals the number of feature elements, each stored pattern being representative of a physical entity and being represented by a second sequence of successive feature elements $B=(B_1, B_2, \ldots, B_i, \ldots B_n)$, the method comprising the steps of:

(a) comparing the query pattern with the $m^{th}$ stored pattern on an element by element basis;

(b) counting as a "first degree of match" for the $m^{th}$ stored pattern, the number of elements of the query pattern which are equal to the corresponding element of the $m^{th}$ stored pattern;

(c) outputting a "matched pattern" indication if the first degree of match for the $m^{th}$ stored pattern is equal of n;

(d) storing the count for the first degree of match for the $m^{th}$ stored pattern if less than n;

(e) repeating steps (a) through (d) for each remaining stored pattern;

(f) computing, using the query pattern and the first degree of match, a first set of n change numbers for the set of stored patterns according to the following equation;

$$D_{1i}[t]: X:B^1, \ldots, B^k) = C(1,t) \, P^{H(1,t)} \, [P^{L'J(X,1)}] \, S_1(X,i) + \ldots +$$
$$C(i,t) \, P^{H(i,t)} \, [P^{L'J(X,i)}] \, S_2(X,i) + \ldots +$$
$$C(k,t) \, P^{H(k,t)} \, [P^{L'J(X,k)}] \, S_k(X,i)$$

where:
(1) $D_{1i}$ is the first change number for the $i^{th}$ element of the query pattern;
(2) P is a positive prime number;
(3) L and L' are integers such that $(L > L' > 1)$;
(4) t indicates a function of time;
(5) C(i,t) is the algebraic sign of the relative importance property of stored pattern $B^i$,
(6) $p^{H(i,t)}$ is the magnitude of the relative importance property of stored pattern $B^i$;
(7) J(X,i) is the degree of match with stored pattern $B^i$;
(8) $S_i(X,i)$ is:
- −1 if the element of $B^z$ and the $i^{th}$ element of X are both 0;

1 if the $i^{th}$ element of $B^z$ and the $i^{th}$ element of X are both 1;
$-p^3$ if the $i^{th}$ element of $B^z$ is 0 and the $i^{th}$ element of X is 1; and
$p^3$ if the $i^{th}$ element of $B^z$ is 1 and the $i^{th}$ element of X is 0;

(g) computing, using the query pattern X and the first et of change numbers, a derived query pattern X' where $X'=(X'_1, X'_2, \ldots, X'_i, \ldots, X'_n)$;

(h) comparing the derived query pattern to the $m^{th}$ stored pattern on an element by element basis;

(i) counting as a "second degree of match" for the $m^{th}$ stored pattern, the number of elements of the derived query pattern which are equal to the corresponding element of the $m^{th}$ stored pattern;

(j) outputting a "matched pattern" indication if the second degree of match for the $m^{th}$ stored pattern is equal to n;

(k) storing the count for the second degree of match for the $m^{th}$ stored pattern if less than n;

(l) repeating steps (h) through (k) for each remaining stored pattern;

(m) computing a second set of n change numbers for the set of stored patterns using the query pattern and the second degree of match;

(n) computing an "answer pattern" using the query pattern, the first set of change numbers and the second set of change numbers.

3. The method of claim 2, further comprising the further step of computing the second set of n change numbers according to the follow equation:

$$D_{2i}[t]:X: B^1, \ldots, B^k) = C(1,t) \, P^{H(1,t)} \, [P^{L'J(X,1)}] \, S_1(X,i) + \ldots +$$
$$C(i,t) \, P^{H(i,t)} \, [P^{L'J(X,i)}] \, S_2(X,i) + \ldots +$$
$$C(k,t) \, P^{H(k,t)} \, [P^{L'J(X,k)}] \, S_k(X,i)$$

where:
(1) $D_{2i}$ is the second change number for the $i^{th}$ element of the query pattern;
(2) t indicates a function of time;
(3) C(i,t) is the algebraic sign of the relative importance property (or zero);
(4) $p^{H(i,t)}$ is the magnitude of the relative importance property;
(5) J(X',i) is the second degree of match (the number of elements of B that agree with the corresponding element of X';
(6) $S_i(X',i)$ is:
- −1 if the element of B and the $i^{th}$ element of X' are both 0;
- 1 if the $i^{th}$ element of B and the $i^{th}$ element of X' are both 1;
- $-p^3$ if the $i^{th}$ element of B is 0 and the $i^{th}$ element of X' is 1; and
- $p^3$ i the $i^{th}$ element of B is 1 and the $i^{th}$ element of X' is 0.

4. A method of matching a first query pattern, taking the form of a set $X=x_{i2}$ with a plurality of stored data patterns, taking the form of a matrix $B=b_{ij2}$, where $i=1, \ldots, n$ is the number of components in each pattern and $j=1, \ldots, k$ is the number of stored data patterns, said method comprising the steps of:

(a) for each stored data pattern, counting the number of components which are identical to corresponding components in said first query pattern, thereby forming a set of match numbers $M=m_{j2}$ where $j=1,\ldots,k$;

(b) if any match number $m_j=n$, then displaying the respective $j^{th}$ stored data pattern an an output pattern set $O_j=o_{ij}$ indicating a match;

(c) if no match number $m_j=n$, then determining a second query pattern $X'=x_i'$ by modifying said first query pattern, component by component, in dependence upon both a first, global influence of all stored patterns on all components of said first query pattern and a second, particular influence of all stored patterns on each respective component of said first query pattern, wherein such step further comprises the steps:

(1) multiplying each match number $m_j$ of a match set M by a first disturbance factor L to produce a set LM;

(2) determining a sign matrix Sgn for all components $sgn_{ij}$ by setting each component equal to $-1$ if the corresponding stored pattern component $b_{ij}$ is 0, and to $+1$ if the stored pattern component is 1;

(3) determining a magnitude matrix Mag for all components according to the formula $mag_{ij}=[-(\text{logxor}(b_{ij},x_i)=1)$, where N is a magnification factor;

(4) determining an exponent matrix $\text{Exp}=\text{LM}+\text{Mag}$ for all components according to the formula $\exp_{ij}=Lm_j+mag_{ij}$;

(5) forming the positive and negative sums for all components as follows:

$\text{Pos.sum}_i=P(\exp_{i,1})+\ldots+P(\exp_{i,k})$ for each $(\exp_{i,k})$ of j where $sgn_{i,j}>0$, $\text{Neg.sum}_i=P(\exp_{i,1})+\ldots+P(\exp_{i,k})$ for each $(\exp_{i,k})$ of j where $sgn_{i,j}<0$;

(6) determining a second query pattern set $X'=x_i'$ for all i as follows:

if $\text{Pos.sum}_i \leq \text{Neg.sum}_i$, then $x_i'=1$, else $x_i'=0$;

(d) repeating steps (a) and (b) using said second query pattern in place of said first query pattern;

(e) if no match number $m_j=n$, then determining a third query pattern $X''=x_i''$ by modifying said second query pattern, component by component, in dependence upon both a third, global influence of all stored patterns on all components of said second query pattern and a fourth, particular influence of all stored patterns on each respective component of said second query pattern, said third and fourth influences being less than said first and second influences, respectively; and (f) displaying as said output pattern O-32 $o_i$, component by component, those respective components of said third query pattern that have been modified at most once from said first query pattern.

5. The method defined in claim 4, further comprising the step of determining a response set $R=r_i$ for all i as follows:

$r_i=x_i$, if $x_i'=x_i$, and $r_i=\text{set flag}$, if $x_i'=x_i$.

6. The method defined in claim 5, wherein step (e) includes the steps (1) through (6), using a second disturbance factor L' which is less than said first disturbance factor L, for those components i that have a set flag.

7. The method defined in claim 4, wherein a height factor set $H=h_j$ is associated with the components of each stored pattern $b_{ij}$, each height factor component $h_j$ being indicative of the relative importance of each stored pattern with respect to the other stored patterns, and wherein said height factor set H is added to the set LM for purposes of determining the matrix Exp.

8. The method defined in claim 7, wherein at least some of said height factor components $h_j$ are a function of time.

9. The method defined in claim 7, wherein each of said height factor components $h_j$ is an integer.

10. The method defined in claim 4, wherein a sign factor set $C=c_j$ is associated with the components of each stored pattern $b_{ij}$, each sign factor component $c_j$ being indicative of whether the pattern component is to be sought, avoided or ignored, and wherein said sign factor set C is multiplied by the sign matrix Sgn for the purposes of determining the positive and negative sums.

11. The method defined in claim 10, wherein at least some of said sign factor components $c_j$ are a function of time.

12. The method defined in claim 10, wherein each of said sign factor components $c_j$ is an integer.

13. The method defined in claim 10, wherein each of said sign factor components $c_j$ assumes one of the values $+1$, 0 and $-1$.

14. The method defined in claim 4, wherein said first disturbance factor L is in the range of 2 to 20.

15. The method defined in claim 4, wherein said first disturbance factor L is in the range of 3 to 7.

16. The method defined in claim 4, wherein said first disturbance factor L is 3.

17. The method defined in claim 16, wherein said second disturbance factor L' is 2.

18. The method defined in claim 4, wherein said magnification factor N is in the range of 2 to 20.

19. The method defined in claim 4, wherein said magnification factor N is in the range of 3 to 7.

20. The method defined in claim 4, wherein said magnification factor N is 3.

* * * * *